US012781690B2

(12) United States Patent
Guerrato et al.

(10) Patent No.: US 12,781,690 B2
(45) Date of Patent: Nov. 3, 2026

(54) FUEL SYSTEM FOR A POWER PLANT

(71) Applicant: PHINIA DELPHI LUXEMBOURG SARL, Belvaux (LU)

(72) Inventors: Diego Guerrato, Gillingham (GB); Neil Wilson, Rochester (GB)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 191 days.

(21) Appl. No.: 18/685,891

(22) PCT Filed: Aug. 23, 2022

(86) PCT No.: PCT/EP2022/073524
§ 371 (c)(1),
(2) Date: Feb. 22, 2024

(87) PCT Pub. No.: WO2023/025824
PCT Pub. Date: Mar. 2, 2023

(65) Prior Publication Data

US 2024/0351432 A1 Oct. 24, 2024

(30) Foreign Application Priority Data

Aug. 23, 2021 (GB) .................................... 2112055

(51) Int. Cl.
*F02M 21/02* (2006.01)
*B60K 15/03* (2006.01)
*B60K 15/077* (2006.01)

(52) U.S. Cl.
CPC ......... *F02M 21/023* (2013.01); *B60K 15/077* (2013.01); *F02M 21/0206* (2013.01);
(Continued)

(58) Field of Classification Search
CPC ........ B60K 15/077; B60K 2015/03026; B60K 2015/03118; B60K 2015/03315;
(Continued)

(56) References Cited

U.S. PATENT DOCUMENTS 3,057,517 A * 10/1962 Douglas ............... B67D 1/0462 222/395
3,947,744 A * 3/1976 Grace ....................... H02J 7/14 320/DIG. 34

(Continued)

FOREIGN PATENT DOCUMENTS

CA 3071067 A1 2/2019
CN 101815893 A 8/2010

(Continued)

OTHER PUBLICATIONS

International Search Report for PCT/EP2022/073524 dated Dec. 5, 2022, 3 pages.

*Primary Examiner* — Kenneth Rinehart
*Assistant Examiner* — Jonathan J. Waddy
(74) *Attorney, Agent, or Firm* — WARNER NORCROSS + JUDD LLP

(57) ABSTRACT

A fuel system for supplying gaseous fuel to a power plant comprises a tank array comprising at least first and second tanks, each tank being configured to receive pressurised gaseous fuel for supply to the power plant; and an auxiliary control fluid delivery system. The auxiliary control fluid delivery system comprises a reservoir of auxiliary control fluid; an auxiliary control fluid pipeline, configured to enable supply of the auxiliary control fluid to the tank array so as to cause discharge of the gaseous fuel held in the tank array and to enable return of the auxiliary control fluid from the tank array; and a valve arrangement which is operable to control the supply and return of auxiliary control fluid to and
(Continued)

from the tank array, respectively, so as to control the discharge of the gaseous fuel.

9 Claims, 6 Drawing Sheets

(52) U.S. Cl.
CPC .... *F02M 21/0224* (2013.01); *F02M 21/0245* (2013.01); *B60K 2015/03026* (2013.01); *B60K 2015/03118* (2013.01); *B60K 2015/03315* (2013.01); *F17C 2227/0192* (2013.01)

(58) Field of Classification Search
CPC ............ B65D 83/7713; B65D 83/7714; B67D 1/0462; B67D 2001/0828; F16K 31/1225; F16K 31/1268; F17C 2227/0192; F17C 5/02; F17C 5/06; F02M 21/0206; F02M 21/0221; F02M 21/0224; F02M 21/023; F02M 21/0245
USPC .................................................. 137/263, 885
See application file for complete search history.

(56) References Cited

U.S. PATENT DOCUMENTS 5,454,408 A * 10/1995 DiBella ................. F04B 9/1176 141/47
5,603,360 A * 2/1997 Teel .......................... F17C 9/00 137/267
5,722,374 A * 3/1998 Kidokoro ............. B60K 15/035 123/518
5,899,272 A * 5/1999 Loree .................. E21B 43/2605 166/280.2
6,755,219 B1 * 6/2004 Bolle ..................... B60K 15/03 141/59
8,899,279 B2 12/2014 Safronovs
12,392,308 B2 * 8/2025 Fernandez-Oxby ......................... F02M 21/0221
2002/0068929 A1 * 6/2002 Zvuloni ................. A61B 18/02 606/22
2006/0137332 A1 * 6/2006 Allgeier .............. F02D 19/0644 60/298
2010/0139777 A1 * 6/2010 Whiteman .............. F17C 5/007 137/255
2010/0163135 A1 * 7/2010 Safronovs ................. F17C 5/06 141/71
2014/0091574 A1 * 4/2014 Favy ....................... F01D 15/10 137/209
2014/0290972 A1 * 10/2014 Robson .................. B25D 9/145 60/415
2015/0362124 A1 * 12/2015 Favy ......................... F02C 6/16 206/0.6
2016/0238194 A1 8/2016 Adler et al.
2018/0119882 A1 * 5/2018 Allidieres ............. F17C 13/025
2018/0320605 A1 11/2018 Mumford et al.
2020/0208784 A1 7/2020 Rakotondrainibe et al.
2020/0346842 A1 * 11/2020 Surjaatmadja ....... B65D 83/771
2021/0041066 A1 2/2021 Garner et al.
2021/0102638 A1 * 4/2021 Fulton ................. F16K 31/1225
2024/0254947 A1 * 8/2024 Fernandez-Oxby ......................... F02M 21/0239
2024/0352899 A1 * 10/2024 Guerrato ............. F02D 19/0644
2024/0352908 A1 * 10/2024 Guerrato .............. F02M 21/023
2025/0137420 A1 * 5/2025 Guerrato ............ F02M 21/0224

FOREIGN PATENT DOCUMENTS

| | | | |
|---|---|---|---|
| CN | 103958902 | A | 7/2014 |
| CN | 107850905 | A | 3/2018 |
| CN | 107735613 | B | 6/2021 |
| EP | 2201282 | A1 | 6/2010 |
| WO | 2009035311 | A1 | 3/2009 |
| WO | 2013056295 | A1 | 4/2013 |

* cited by examiner

FUEL SYSTEM FOR A POWER PLANT

CROSS-REFERENCE TO RELATED APPLICATIONS

This application is the U.S. National Stage of International Application No. PCT/EP2022/073524 filed on 23 Aug. 2022, which claims priority to and all advantages of United Kingdom Application No. 2112055.5 filed on 23 Aug. 2021, the contents of which are incorporated herein by reference.

FIELD OF THE INVENTION

This invention relates to a fuel system for supplying gaseous fuel to a gaseous-fueled power plant. In particular, but not exclusively, the invention relates to a fuel system which uses hydrogen as the source of fuel to be supplied to a power plant in the form of an internal combustion engine. The internal combustion engine may form part of a gas-fueled vehicle.

BACKGROUND

There is an increasing drive in modern technology areas to move away from fossil fuels as a source of energy and to replace them with renewable energy sources. One notable development in recent years has been the development of electric vehicles where the fuel tank of the traditional internal combustion engine is replaced with a battery. However, current electric vehicle technologies have not achieved an energy density from the battery which is comparable with that achieved using traditional fuels (e.g. gasoline, diesel). Furthermore, such systems are limited with their range of travel which does not suit all user requirements, and for heavy duty applications where the size of the battery is impractical.

One alternative to these systems is to use a traditional internal combustion engine (ICE) but running on ecologically produced hydrogen gas. Such systems have been proposed in the art, but there are various efficiency concerns over those solutions and commercially viable options for such “hydrogen ICE” systems remain a challenge. One problem is that, for system efficiency, the hydrogen needs to be injected at pressures considerably higher than atmospheric pressure, which poses technical challenges for existing tank and injector designs.

Other gaseous fuels are also known for use in generating motive power, including compressed natural gas (CNG). Fuel cell technology, which relies on the ionisation of hydrogen within an electrolyte to generate electricity, is also well known for use in vehicles. Both systems require a source of gaseous fuel to generate motive power for the vehicle.

It is against this background that the invention has been devised.

SUMMARY OF THE INVENTION

According to a first aspect of the invention, there is provided a fuel system for supplying gaseous fuel to a power plant, the fuel system comprising a tank array comprising at least first and second tanks, each tank being configured to receive pressurised gaseous fuel for supply to the power plant; and an auxiliary control fluid delivery system. The auxiliary control fluid delivery system comprises a reservoir of auxiliary control fluid; an auxiliary control fluid pipeline configured to enable supply of the auxiliary control fluid to the tank array so as to cause discharge of the gaseous fuel held in the tank array and to enable return of the auxiliary control fluid from the tank array; and a valve arrangement which is operable to control the supply and return of auxiliary control fluid to and from the tank array, respectively, so as to control the discharge of the gaseous fuel. The valve arrangement comprises a control valve operable to close the reservoir of auxiliary control fluid from the auxiliary control fluid pipeline to enable transfer of the auxiliary control fluid between the first and second tanks, without re-entering the reservoir. Each of the first and second tanks includes a separation element to separate the auxiliary control fluid from the gaseous fuel within the respective tank.

The control valve enables auxiliary control fluid to be transferred directly between the first and second tanks, without re-entering the reservoir, for the purpose of discharging the gaseous fuel from the tank array to the power plant.

The control valve arrangement may be operable in either a first state or a second state, and may be configured such that in the first state, the reservoir is in fluid communication with the auxiliary control fluid pipeline and, in the second state, the reservoir is closed from the auxiliary control fluid pipeline and there is no fluid communication therebetween.

The valve arrangement includes, for each of the first and second tanks, an inlet one-way valve for controlling the supply of auxiliary control fluid to the associated tank and an outlet one-way valve for controlling the supply of auxiliary control fluid from the associated tank to the auxiliary control fluid reservoir.

The separation element may include any one of a membrane, a bladder, a diaphragm, a piston or a bellows arrangement.

The auxiliary control fluid pipeline may comprise an auxiliary control fluid supply line between the auxiliary control fluid reservoir and the tank array. The auxiliary control fluid supply line may be provided with a pressurising means to pressurise the supply of auxiliary control fluid to the tank array.

The pressurising means may be operable in a first state in which auxiliary control fluid flowing through the auxiliary control fluid supply line is pressurised or may be operable in a second state in which auxiliary control fluid flowing through the auxiliary control fluid supply line is not pressurised.

The pressurising means may be selectively operable in either the first state or the second state in dependence on the state of the control valve arrangement. For example, the pressurising means may be configured to be in the second state when the control valve arrangement is in the second state.

The control valve arrangement may be located at an outlet of the reservoir. The control valve arrangement may be located intermediate the outlet of the reservoir and a junction between the auxiliary control fluid supply line and an auxiliary control fluid return line to the reservoir.

At least the first tank of the tank array is provided with a biasing means which acts on the separation member to oppose movement thereof during a filling phase of the fuel system so as to store energy within the biasing means for use during a discharge phase of gas from the first tank.

The power plant may be an internal combustion engine of a vehicle or a fuel cell for an engine in a gaseous fuel-powered vehicle.

The gaseous fuel may be hydrogen.

According to a second aspect of the invention, there is provided a method for controlling delivery of auxiliary control fluid to a fuel tank array comprising a first tank and a second tank, the method comprising providing a reservoir of auxiliary control fluid; delivering the auxiliary control fluid to the first tank via an auxiliary control fluid pipeline so as to control the discharge of fuel from the first tank; operating a control valve arrangement to close communication between the reservoir and the auxiliary control fluid pipeline and between the reservoir and the tank array; and transferring at least some of the auxiliary control fluid from the first tank to a second tank via the auxiliary control fluid pipeline so as to control the discharge of fuel from the second tank.

It will be appreciated that the various features of the first aspect of the invention are equally applicable to, alone or in appropriate combination, the second aspect of the invention also.

BRIEF DESCRIPTION OF THE DRAWINGS

The above and other aspects of the invention will now be described, by way of example only, with reference to the accompanying drawings, in which.

SPECIFIC DESCRIPTION

Figure 1:
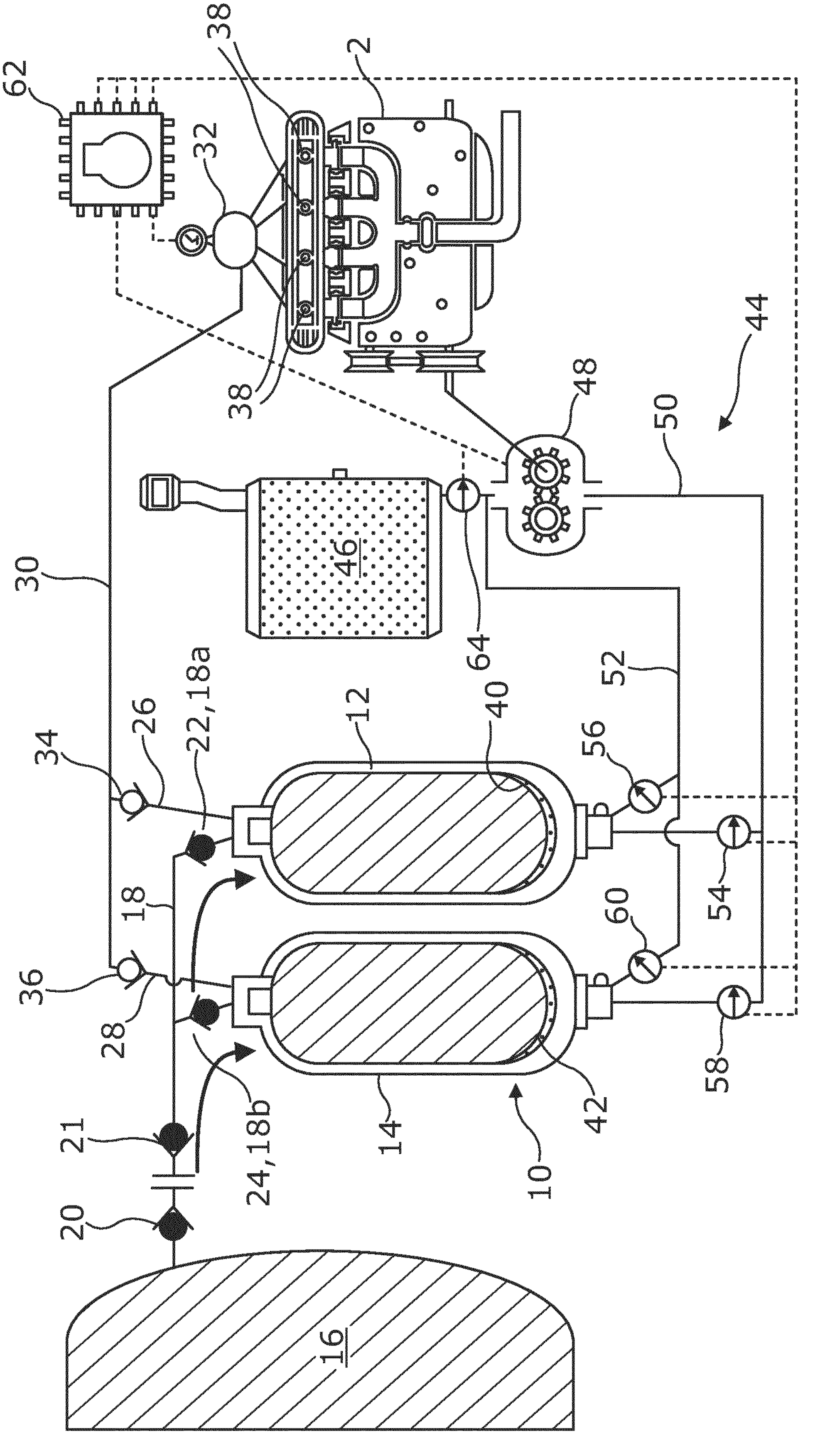
FIG. 1 is a schematic illustration of a fuel system in accordance with a first embodiment of the invention.

The present invention relates to the use of pressurised gaseous fuel to generate power within a power plant 2, such as an engine. One specific example of such a fuel system is shown in FIG. 1, which shows a fuel system for use in supplying pressurised hydrogen gas to an internal combustion engine 2 of a vehicle.

The fuel system includes a tank array 10 including at least a first tank 12. In the embodiment of FIG. 1, the tank array 10 includes at least a first tank 12 and a second tank 14 configured to receive gaseous hydrogen from a supply tank 16 at a refuelling station. The first and second tanks 12, 14 are connected to the supply tank 16 via a supply line 18. The supply tank 16 has a supply non-return valve 20 which is operable to open only when a fuel system is connected to the supply tank 16 for refilling. The supply line 18 is also provided with a supply inlet non-return valve 21 which ensures the system (i.e. the supply line 18) remains closed when it is detached from the supply tank 16 at the refuelling station.

The supply line 18 from the supply tank 18 has two branches: a first branch 18*a* in communication with the first tank 12 and a second branch 18*b* in communication with the second tank 14. The first branch 18*a* of the supply line 18 is provided with a first tank inlet non-return valve 24 which is operable to control the pressure of gas within the first tank 12 when the supply tank 16 is connected to the first tank 12. When the pressure of hydrogen gas within the supply tank 16 exceeds that within the first tank 12, the first tank inlet non-return valve 22 is caused to open to allow hydrogen gas to flow into the first tank 12. The first tank inlet non-return valve 22 closes when the pressure of hydrogen gas within the first tank 12 equalizes with that of the supply tank 16 and the first tank 12 is full. Likewise, the second branch 18*b* of the supply line 18 is provided with a second tank inlet non-return valve 24 which is operable to control the pressure of gas within the second tank 14. When the pressure of hydrogen gas within the supply tank 16 exceeds that within the second tank 14, the second tank inlet non-return valve 24 is caused to open to allow hydrogen gas to flow into the second tank 14. The second tank inlet non-return valve 24 closes when the pressure of hydrogen gas within the second tank 14 equalizes with that of the supply tank 16 and the second tank 14 is full.

In FIG. 1, both the first tank 12 and the second tank 16 are full of hydrogen gas at the end of the system filling phase.

In addition to the respective branches 18*a*, 18*b* of the supply line 18, each of the first and second tanks 12, 14 includes a respective outlet line 26, 28 which connects the respective tank to a common outlet line 30 for a fuel rail 32 for receiving pressurised hydrogen gas from the tanks 12, 14. An outlet non-return valve is provided for each tank within the associated outlet line 26, 28. A first tank outlet non-return valve 34 is associated with the first tank 12 and a second tank outlet non-return valve 36 is associated with the second tank 14. The outlet non-return valves 34, 36 are operable to open when the pressure of hydrogen gas in the associated tank exceeds the pressure of hydrogen gas within the common outlet line 30 (and hence the fuel rail 32) but they prevent the return flow of pressurised hydrogen gas from the common outlet line 30 and fuel rail 32 to the first and second tanks 12, 14.

Typically, the hydrogen gas that is supplied from the supply tank 16 at the refuelling station is pressurised to a storage pressure $P_s$ of between 600 and 800 bar, preferably 700 bar.

Although the first and second tank outlet non-return valves 34, 36 are shown as being closed in FIG. 1, it will be appreciated by the skilled person that the tank outlet non-return valves 34, 36 may open during the system filling phase if the pressure of hydrogen gas within the common outlet line 30 and the fuel rail 32 is lower than the pressure of hydrogen gas within the first and second tanks 12, 14. This allows the pressure to equalise between the first and second tanks 12, 14 and the common outlet line 30 and the fuel rail 32 during the filling phase.

The fuel rail 32 is configured to deliver gaseous hydrogen to a plurality of fuel injectors 38 of the fuel system. In the embodiment shown the fuel system includes four injectors 38, each corresponding to a respective cylinder (not shown) of the engine 2. The injectors 38 inject the hydrogen fuel at an injection pressure $P_i$, which is typically less than the storage pressure $P_s$.

Each of the first and second tanks 12, 14 is identical internally and includes a separation member in the form of a movable membrane, referred to as first and second tank membranes 40, 42. Considering the first tank 12, the first tank membrane 40 is movable depending on the presence of an auxiliary control fluid that is supplied to the first tank 12 via an auxiliary control fluid delivery system, referred to generally as 44. Likewise, a second tank membrane 42 associated with the second tank 14 is movable depending on the presence of an auxiliary control fluid supplied to the second tank 14.

The auxiliary control fluid delivery system 44 includes an auxiliary supply tank 46 (referred to as the auxiliary tank) containing an auxiliary control fluid, pressurising means in the form of a pump 48, an auxiliary control fluid pipeline (comprising an auxiliary control fluid supply line 50 and an auxiliary control fluid return line 52 which meet each other at a junction) and a valve arrangement for controlling the supply of auxiliary control fluid to the tank array 10. By way of example, the auxiliary control fluid may take the form of liquid oil. The auxiliary control fluid is considered to be a control fluid for reasons that will become clear in the following description.

The pump 48 is located on the auxiliary control fluid supply line 50 and both the auxiliary control fluid supply and return lines 50, 52 are in fluid communication with a sole inlet/outlet port of the auxiliary tank 46. The pump 48 is driven by a crank or shaft whose motion is coupled to that of a corresponding crank or shaft of the internal combustion engine 2. In other embodiments, the pump 48 may be electrically driven.

The valve arrangement includes five valves, two of which are associated with the first tank 12 and two of which are associated with the second tank 14. For the first tank 12, a first inlet one-way valve 54 controls the supply of auxiliary control fluid between the auxiliary tank 46 and the first tank 12 along the auxiliary control fluid supply line 50 and a first outlet one-way valve 56 controls the return flow of auxiliary control fluid from the first tank 12 to the auxiliary tank 46 along the auxiliary control fluid return line 52. Likewise, for the second tank 14, a second inlet one-way valve 58 controls the supply of auxiliary control fluid between the auxiliary tank 46 and the second tank 14 along the auxiliary control fluid supply line 50 and a second outlet one-way valve 60 controls the return flow of auxiliary control fluid from the second tank 14 to the auxiliary tank 46 along the auxiliary control fluid return line 52.

The final valve 64 of the valve arrangement is associated with the auxiliary tank 46 and acts as a control valve to control the flow of auxiliary control fluid out of and into the auxiliary tank 46. The auxiliary tank valve 64 is positioned between the inlet/outlet port of the auxiliary tank 46 and the junction between the auxiliary control fluid supply and return lines 50, 52. The auxiliary tank valve 64, when in an open state, is operable to allow one-way flow of the auxiliary control fluid either out of or into the auxiliary tank 46, typically, although not exclusively, via the auxiliary control fluid supply and return lines 50, 52, respectively.

The auxiliary tank valve 64 is also operable, when in a closed state, to separate the auxiliary tank 46 from the rest of the auxiliary control fluid delivery system 44 (i.e., the auxiliary control fluid supply and return lines 50, 52) and the first and second tanks 12, 14, and in so doing create a closed loop where auxiliary control fluid can flow directly between the auxiliary control fluid supply and return lines 50, 52. This creates advantages when auxiliary control fluid is transferred between the first and second tanks 12, 14, as described below.

The five valves of the valve arrangement are controlled by means of an electronic control unit (ECU) 62, as indicated by the electrical connections shown in dashed lines. Likewise, the ECU 62 also controls the pump 48 which pressurises the auxiliary control fluid for supply to the first and second tanks 12, 14, as further illustrated by the electrical connections shown in dashed lines.

In the configuration shown in FIG. 1, the first and second tanks 12, 14 have just been re-filled at the refuelling station such that both the first and second tanks 12, 14 are full of hydrogen gas. In each of the fuel tanks, the gas is separated from the oil is by the associated movable membrane 40, 42 which is movable within the associated tank depending on the quantity of oil supplied to the tank from the auxiliary tank 46. The auxiliary tank valve 64 is shown closed in FIG. 1, to prevent supply of the oil to the first and second tanks 46.

The method of operation of the fuel system will now be described with reference to FIGS. 2 to 5.

Figure 2:
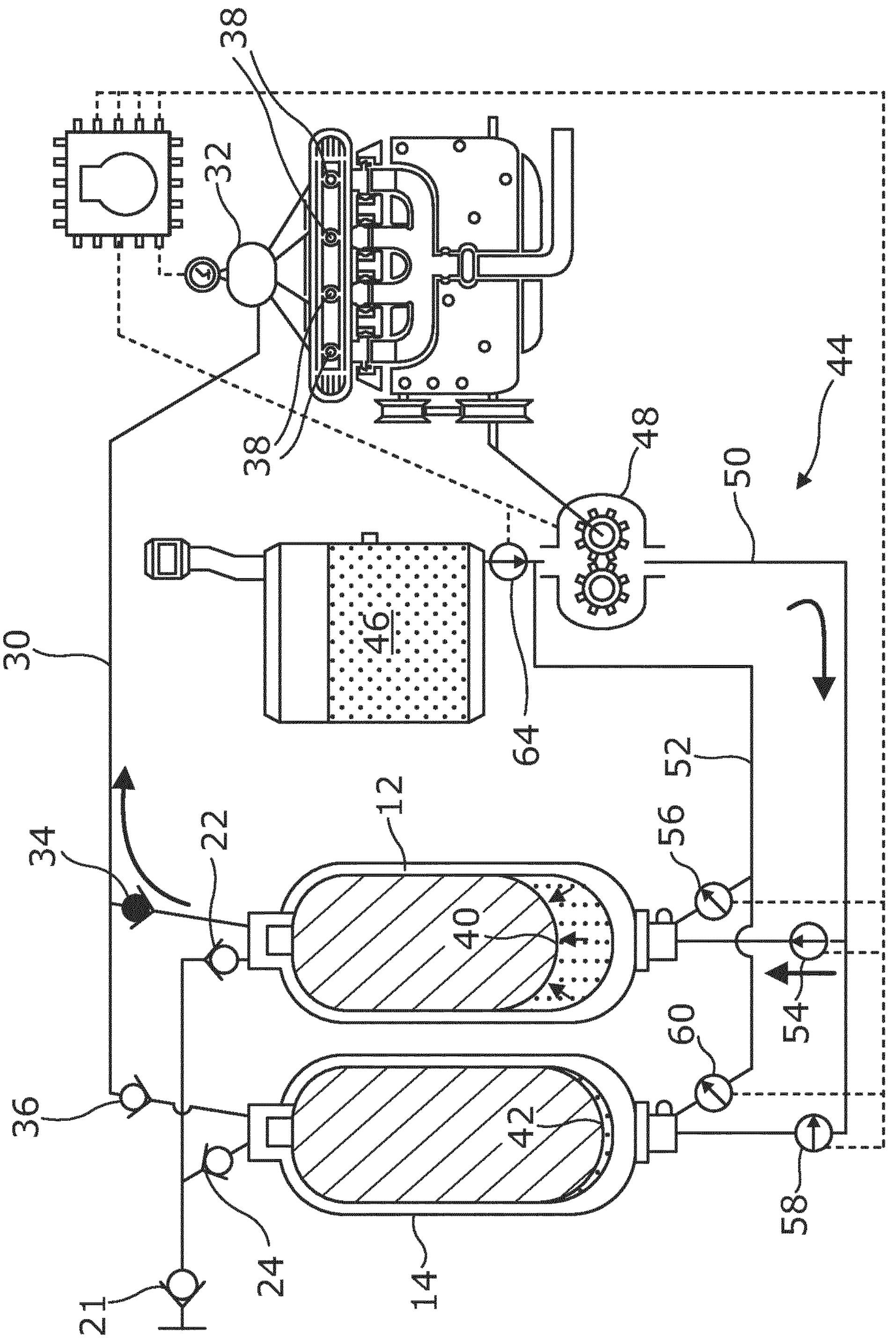
FIGS. 2 to 6 are schematic illustrations of the fuel system in FIG. 1 to illustrate various method steps of operation of the system.

FIG. 2 shows the fuel system having been detached from the re-fueling system.

Initially, hydrogen gas can be supplied to the injectors 38 without the intervention of the auxiliary control fluid delivery system 44, since the pressure of hydrogen gas in the first and second tanks 12, 14 and the common outlet line 30 and fuel rail 32 exceeds the injection pressure $P_i$. As fuel is supplied to the injectors 38 from the fuel rail 32, the pressure of hydrogen gas in the fuel rail 32 and common outlet line 30 decreases. This causes the first and second tank outlet non-return valves 34, 36 to open to allow the pressure of hydrogen to equalise between the first and second tanks 12, 14 and the common outlet line 30 and fuel rail 32. Eventually, as more hydrogen gas is supplied from the first and second tanks 12, 14, the pressure in the first and second tanks 12, 14 and in the common outlet line 30 and the fuel rail 32 decreases to match the injection pressure $P_i$. At this point, the injectors 38 cannot be supplied with hydrogen gas without the assistance of the auxiliary control fluid delivery system 44.

In FIG. 2, the auxiliary tank valve 64 and the first inlet one-way valve 54 of the first tank are opened by the ECU 62 so that oil within the auxiliary tank 46 is able to flow along the auxiliary control fluid supply line 50, via the pump 48, into the first tank 12. As a result of the incoming oil flow, the first tank membrane 40 is displaced upwardly (in the illustration shown), reducing the volume of the available space for the hydrogen gas and causing the pressure of the hydrogen gas in the first tank 12 to increase above the pressure of the hydrogen gas in the common outlet line 30 and the fuel rail 32. As a result, the first tank outlet non-return valve 34 is caused to open to discharge hydrogen gas from the first tank 12 into the common outlet line 30 to the fuel rail 32. This is described as the “delivery phase” for the first tank 12 as hydrogen gas is delivered into the fuel rail 32 and enables the supply of hydrogen gas to the injectors 38 once the pressure in the tank array 10, the common outlet line 30 and the fuel rail 32 has reached the injection pressure $P_i$. In FIG. 2, it can be seen that the oil is starting to empty from the auxiliary tank 46 during this phase, displacing the hydrogen gas from the first tank 12 to the common rail 32.

While the first tank 12 is in the delivery phase, the second tank 14 is in a “waiting phase”, still full with pressurised hydrogen gas at the injection pressure $P_i$. The non-return aspect of the second tank outlet non-return valve 36 prevents the hydrogen in the common outlet line 30 entering the second tank 14, despite being at a higher pressure than the hydrogen in the second tank 14. The supply inlet non-return valve 21 is closed (as the system is detached from the filling station) and the first and second tank inlet non-return valves 22, 24 are also closed.

Figure 3:
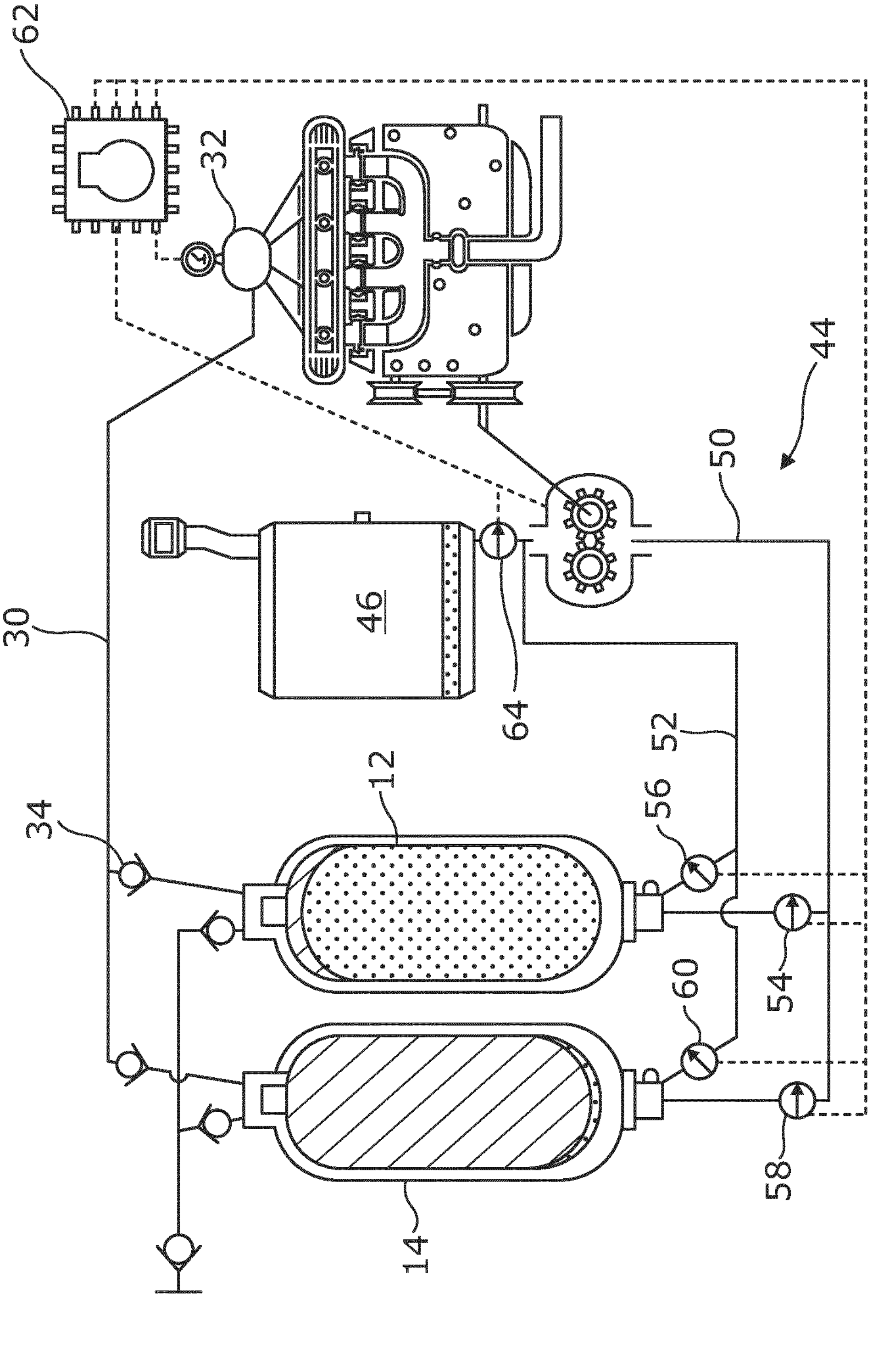

In FIG. 3, the first tank 12 has been depleted of hydrogen gas and filled with oil. The auxiliary tank valve 64 and the first inlet one-way valve 54 are therefore closed by the ECU 62 to prevent further supply of oil to the first tank 12. Closing the auxiliary tank valve 64 closes communication between the auxiliary tank 46 and the supply and return lines, 50, 52, and between the auxiliary tank 46 and the tanks 12, 14, and hence cuts the auxiliary tank 46 off from the rest of the auxiliary control fluid delivery system 44. Therefore, a closed loop is created comprising the auxiliary control fluid supply and return lines 50, 52, as well as the first and second tanks 12, 14. With the first tank 12 depleted of hydrogen gas, the first tank outlet non-return valve 34 also closes, under the pressure of hydrogen gas within the common outlet line 30, to prevent any return flow of hydrogen gas into the first tank 12. Hydrogen gas within the common outlet line 30 and the fuel rail 32 is therefore unable to return to the first tank 12, despite the hydrogen gas in the common outlet line 30 and the fuel rail 32 being at a higher pressure than the pressure in the first tank 12.

It will be appreciated that the arrangement of the fuel system shown in FIG. 3 is not a defined stage of the fuel delivery process as such and may only occur instantaneously, since it is likely that the gaseous hydrogen fuel will be required to be continuously supplied to the fuel rail 32 and injectors 38 over the period in which the first tank 12 is depleted of hydrogen gas and fuel delivery must be initiated from the second tank 14.

Figure 4:
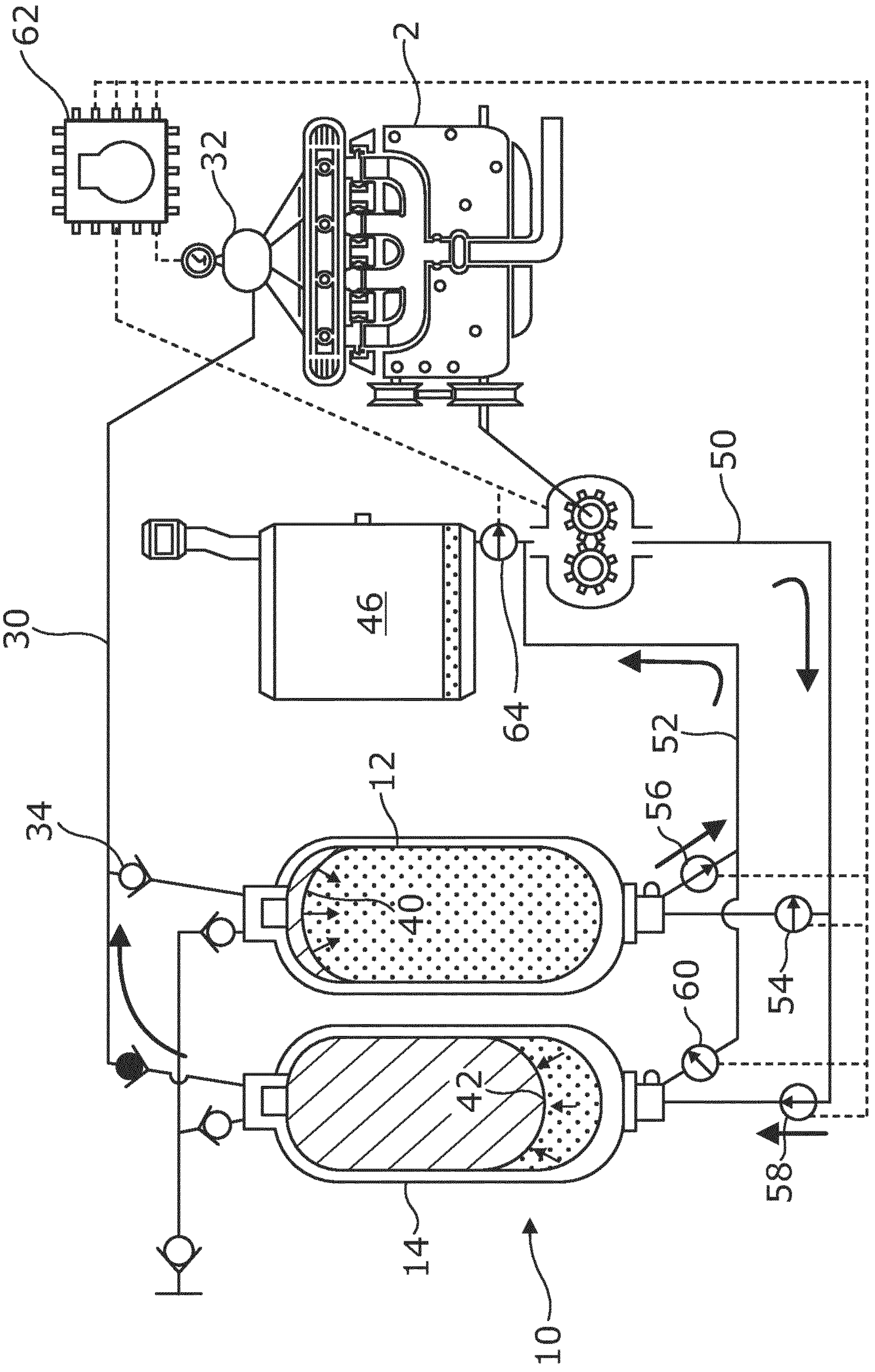

Referring now to FIG. 4, with the first tank 12 depleted of hydrogen gas, subsequent delivery of hydrogen gas to the common outlet line 30 and fuel rail 32 must be made by the second tank 14. However, the pressure of the hydrogen gas within the second tank 14 is still at the injection pressure $P_i$, as a result of the initial discharge of hydrogen gas to the common outlet line 30 and fuel rail 32 immediately after the tank array 10 was refilled. In order to achieve this, therefore, the first tank 12 enters an "oil discharge phase", during which the first outlet one-way valve 56 is opened by the ECU 62 to allow the oil within the first tank 12 to flow into the auxiliary control fluid return line 52. With the auxiliary tank valve 64 still closed, the oil in the auxiliary control fluid return line 52 cannot flow back into the auxiliary tank 46. Instead, the second inlet one-way valve 58 is opened by the ECU 62 to allow the oil in the auxiliary control fluid return line 52 to instead flow into the second tank 14 via the auxiliary control fluid supply line 50. The oil may still pass through the pump 48 but, due to the closed loop created by closing the auxiliary tank valve 64, the pump 48 is not required to re-compress the oil as it has not been returned to the auxiliary tank 46 and is therefore still pressurised. Alternatively, the skilled person would appreciate that the pump 48 may be by-passed in this scenario by an additional arrangement of ECU-controlled valves and pipelines.

It will be appreciated, therefore, that the pump 48 is configured so that, in the case where the pump 48 is not by-passed (the configuration shown in FIG. 4), it is capable of two distinct modes of operation: a first mode in which the pump 48 is configured to pressurise the oil as it passes through the pump 48, and a second mode in which the pump 48 does not pressurise the oil passing therethrough. The pump is therefore selectively operable in either of these two modes of operation and may be considered to be in first and second states when operating in the first and second modes, respectively. The selection between states/modes of the pump 48 may be controlled by the ECU 62 and may be made in dependence on the state of the auxiliary tank valve 64. For example, the pump 48 may be configured to be in the first state when the auxiliary tank valve 64 is open and in the second state when the auxiliary tank valve 64 is closed. This ensures that the pump 48 only pressurises the oil when the oil is flowing out of the auxiliary tank 46, and not after it has flowed through the auxiliary control fluid return line 52 as it travels between the first and second tanks 12, 14.

In a similar way, even in the alternative arrangement where the pump 48 is by-passed by an additional arrangement of ECU-controlled valves and pipelines, the pump 48 may be considered to exist in two different states: a first state in which the pump 48 is in fluid communication with the rest of the auxiliary control fluid pipeline and a second state in which the pump 48 is cut off from fluid communication with the auxiliary control fluid pipeline. Therefore, the pump 48 may again be selectively operable between these first and second states in dependence on the state of the auxiliary tank valve 64: being in the first state when the auxiliary tank valve 64 is open and in the second state when the auxiliary tank valve 64 is closed.

It will be appreciated by the skilled person that, with the first tank outlet non-return valve 34 closed, the discharge of the auxiliary control fluid out of the first tank 12 leaves the first tank 12 substantially empty, save for some small amount of residual hydrogen gas. However, the residual pressure existing in the first tank 12 when the auxiliary fluid has been fully discharged still exceeds atmospheric pressure.

As a result of the incoming oil flow from the auxiliary control fluid supply line 50, the second membrane 42 within the second tank 14 is displaced upwardly (in the illustration shown), reducing the volume of the available space for the hydrogen gas and causing the pressure of the hydrogen gas within the second tank 14 to increase above the pressure of the hydrogen gas in the common outlet line 30 and the fuel rail 32. As a result, the second tank outlet non return valve 36 is caused to open to discharge hydrogen gas from the second tank 14 into the common outlet line 30 to the fuel rail 32. This is described as the "delivery phase" for the second tank 14 as hydrogen gas is delivered into the fuel rail 32 through the common outlet line 30. Throughout the delivery phase of the second tank 14 the first inlet one-way valve 54 is maintained in the closed position so that oil does not recirculate into the first tank 12 at the same time. Likewise, the second outlet one-way valve 60 remains closed.

Therefore, the oil discharge phase of the first tank 12 is implemented at substantially the same time as the delivery phase of the second tank 14, with the oil transferred between the first and second tanks 12, 14 without re-entering the auxiliary tank 46 and the subsequent need for re-pressurisation of the oil by the pump 48. This speeds up the process of transferring the oil from the first tank 12 to the second tank 14 once the first tank 12 is depleted and, since the pump 48 is driven by the engine 2, also reduces the power input from the engine 2 to the fuel system. The first outlet one-way valve 56 and the second inlet one-way valve 58 need not be operated exactly simultaneously, although they could be, but it is a case that the second inlet one-way valve 58 is opened at some stage for which the first outlet one-way valve 56 is opened. The timing of operation of the valves must ensure that sufficient oil has been discharged from the first tank 12 as the second inlet one-way valve 58 is opened. The timing of operation of the valves must also ensure that the pressure of hydrogen within the fuel rail 32 never drops below the pressure required for injection to enable continuous supply of fuel to the power plant 2.

Figure 5:
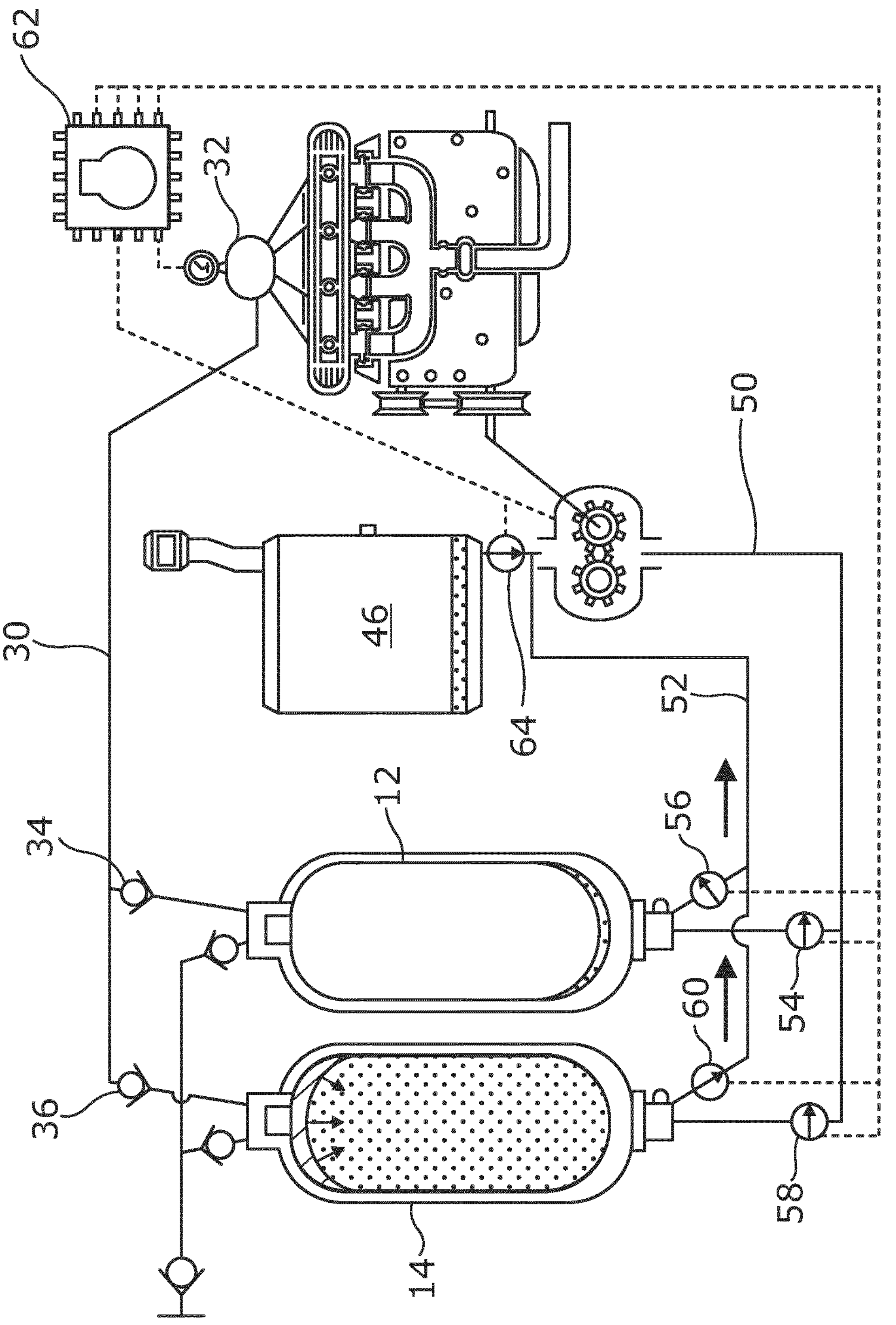

FIG. 5 shows the situation where the oil has been fully discharged from the first tank 12, leaving it empty, and the second tank 14 has been depleted of hydrogen gas and filled with oil. The ECU 62 therefore sends a control signal to close the first outlet one-way valve 56 and the second inlet one-way valve 58. With the second tank 14 now also depleted of hydrogen gas, the second tank outlet non-return valve 36 also closes, under the pressure of hydrogen gas within the common outlet line 30, to prevent any return flow of hydrogen gas into the second tank 14. Hydrogen gas within the common outlet line 30 and the fuel rail 32 is therefore unable to return to the second tank 14, despite the hydrogen gas in the common outlet line 30 and the fuel rail 32 being at a higher pressure than the pressure in the second tank 14.

Figure 6:
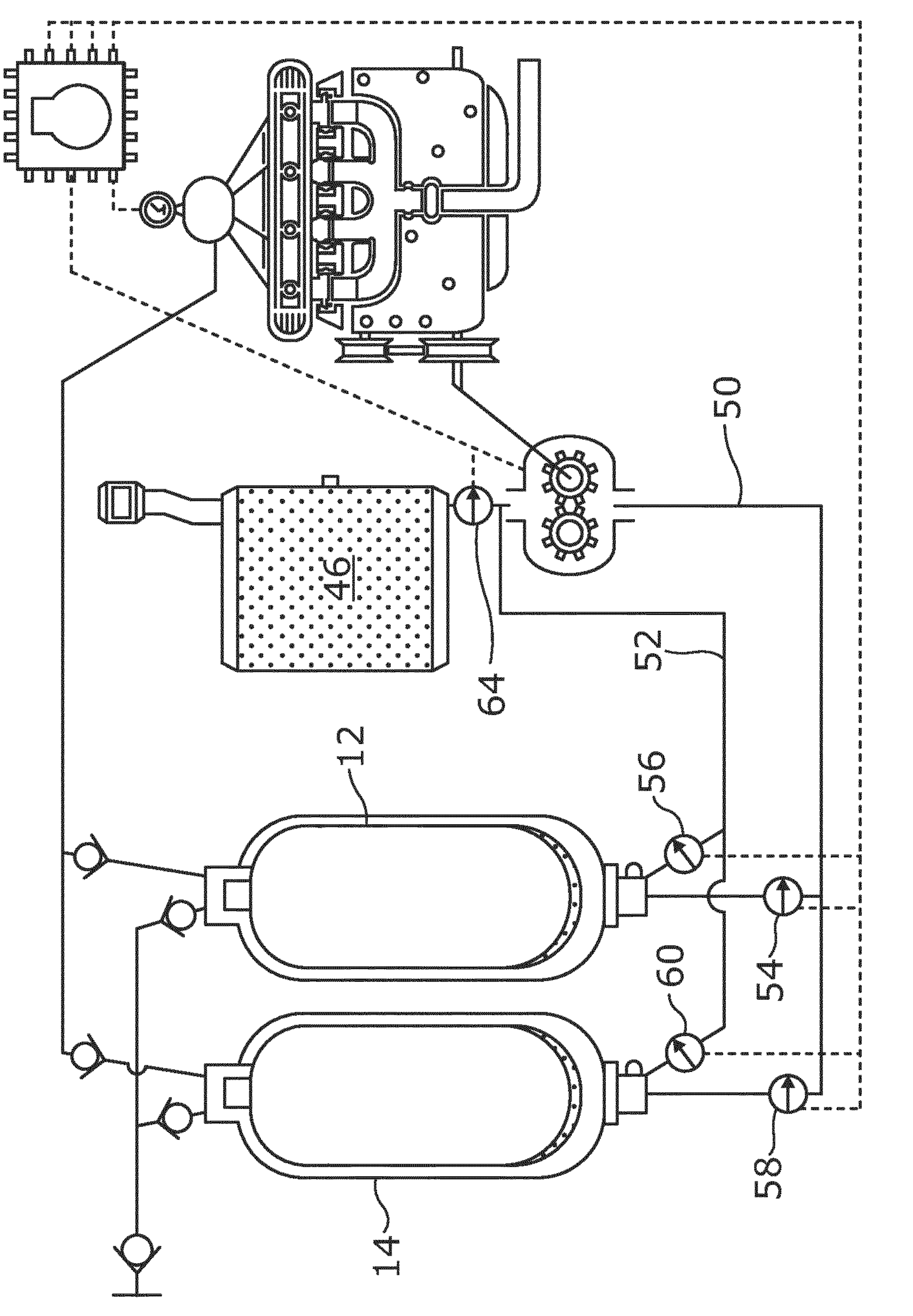

The second tank 14 then enters the "oil return phase", with the second outlet one-way valve 60 and auxiliary tank valve 64 being opened by the ECU 62, thereby allowing the oil to flow back into the auxiliary tank 46 along the auxiliary control fluid return line 52. Eventually, the second tank is emptied of oil, and both the first and second tanks 12, 14 are left empty, with the auxiliary tank 46 refilled with oil, as shown in FIG. 6. After this, the auxiliary tank valve 64 is closed by the ECU 62 to prevent oil entering either the auxiliary control fluid supply line 50 or the auxiliary control fluid return line 52. The first and second outlet and inlet one-way valves 54, 56, 58, 60 are also closed by the ECU 62.

As with the first tank 12, once the oil has been fully discharged from the second tank 14 back to the auxiliary tank 46, the second tank 14 is left substantially empty of hydrogen gas, with only a small residual amount of hydrogen gas left inside the second tank at a residual pressure exceeding atmospheric pressure.

Once the first tank 12 and the second tank 14 have been discharged of hydrogen gas, the system requires re-filling at the filling station (as in FIG. 1). The system may also be re-filled with hydrogen gas when either one or both of the tanks 12, 14 are partially emptied, depending on the convenience of the user.

It will be appreciated that various other embodiments of the invention are also envisaged without departing from the scope of the appended claims. In particular, it will be appreciated that the tank array 10 may comprise more tanks than the two described here, with similar processes to those described above used to transfer auxiliary fluid between any of the tanks. Also, the system has been described with reference to a supply of gaseous fuel to an internal combustion energy of a vehicle, but it will be appreciated that it is equally applicable to other applications in which there is a need to supply gaseous fuel for power generation. When employed to supply gaseous fuel to an engine, the engine may, but need not, form a part of a vehicle. Other vehicle applications are envisaged, including fuel cell applications where the fuel system is used to supply hydrogen gaseous fuel to a cell as opposed to a rail for hydrogen gas storage. The invention is also applicable to other types of gas, and not just hydrogen gas. For example, the fuel system may provide a supply of compressed natural gas to a power plant, for example an engine.

The invention claimed is:

1. A method for controlling delivery of gaseous fuel to a power plant from a tank array comprising a first tank and a second tank, the method comprising:

providing a reservoir for auxiliary control fluid;

delivering the auxiliary control fluid to the first tank via an auxiliary control fluid pipeline so as to control the discharge of gaseous fuel from the first tank;

operating a control valve arrangement to close communication between the reservoir and the auxiliary control fluid pipeline and between the reservoir and the tank array; and transferring at least some of the auxiliary control fluid from the first tank to the second tank via the auxiliary control fluid pipeline, without re-entering the reservoir, so as to control the discharge of gaseous fuel from the second tank.

2. A fuel system for supplying gaseous fuel to a power plant, the fuel system comprising:

a tank array comprising at least first and second tanks, each tank being configured to receive pressurised gaseous fuel for supply to the power plant; and an auxiliary control fluid delivery system, wherein the auxiliary control fluid delivery system comprises:

a reservoir for auxiliary control fluid;

an auxiliary control fluid pipeline comprising:

an auxiliary control fluid supply line between the reservoir and the tank array, the auxiliary control fluid supply line configured to enable supply of the auxiliary control fluid to the tank array so as to cause discharge of the gaseous hydrogen fuel held in the tank array, wherein the auxiliary control fluid supply line is provided with a pressurising means to pressurise the supply of auxiliary control fluid to the tank array, wherein the pressurising means is operable in a first state in which auxiliary control fluid flowing through the auxiliary control fluid supply line is pressurised or is operable in a second state in which auxiliary control fluid flowing through the auxiliary control fluid supply line is not pressurised; and an auxiliary control fluid return line configured to enable return of the auxiliary control fluid from the tank array;

wherein the auxiliary control fluid delivery system further comprises a valve arrangement which is operable to control the supply and return of the auxiliary control fluid to and from the tank array, respectively, so as to control the discharge of the gaseous fuel to the power plant, the valve arrangement comprising a control valve arrangement operable to close the reservoir of auxiliary control fluid from the auxiliary control fluid pipeline to enable the transfer of the auxiliary control fluid between the first and second tanks without re-entering the reservoir;

wherein the control valve arrangement is operable in either a first state or a second state, and is configured such that in the first state, the reservoir is in fluid communication with the auxiliary control fluid pipeline and, in the second state, the reservoir is closed from the auxiliary control fluid pipeline and there is no fluid communication therebetween, and wherein the pressurising means is selectively operable in either the first state or the second state in dependence on the state of the control valve arrangement, and the pressurising means is configured to be in the second state when the control valve arrangement is in the second state;

wherein each of the first and second tanks includes a separation element to separate the auxiliary control fluid from the gaseous fuel within the respective tank.

3. The fuel system as claimed in claim 2, wherein the valve arrangement includes, for each of the first and second tanks, an inlet one-way valve for controlling the supply of auxiliary control fluid to the associated tank and an outlet one-way valve for controlling the supply of auxiliary control fluid from the associated tank to the reservoir.

4. The fuel system as claimed in claim 2, wherein the separation element includes any one of a membrane, a bladder, a diaphragm, a piston or a bellows arrangement.

5. The fuel system of claim 2, wherein the control valve arrangement is located at an outlet of the reservoir.

6. The fuel system of claim 5, wherein the control valve arrangement is located intermediate the outlet of the reservoir and a junction between the auxiliary control fluid supply line and the auxiliary control fluid return line to the reservoir.

7. The fuel system of claim 2, wherein at least the first tank of the tank array is provided with a biasing means which acts on the separation member of the first tank to oppose movement thereof during a filling phase of the fuel system so as to store energy within the biasing means for use during a discharge phase of gaseous fuel from the first tank.

8. The fuel system of claim 2, wherein the power plant is an internal combustion engine of a vehicle.

9. The fuel system of claim 2, wherein the gaseous fuel is hydrogen.

* * * * *